Figure 1:
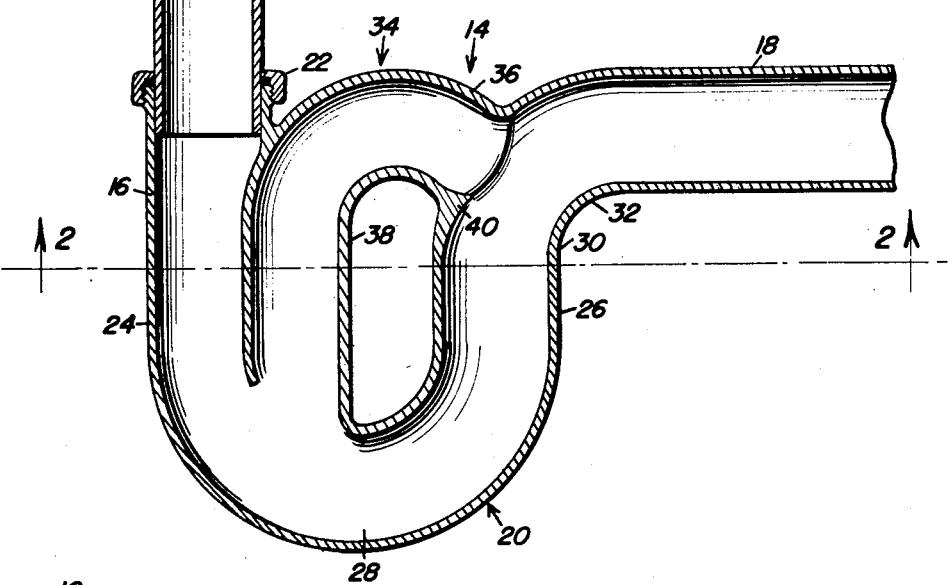

William J. Baumbach
INVENTOR.

2,910,997
ANTI-BACK PRESSURE TRAP
William J. Baumbach, Arlington, Va.

Application August 29, 1957, Serial No. 680,979

2 Claims. (Cl. 137—247.29)

This invention relates in general to new and useful improvements in plumbing fittings and more specifically to an improved trap.

Generally speaking, the water seal of a trap may be broken primarily by creating a back pressure on the trap or by creating a vacuum. Although a vacuum normally does not exist in a proper plumbing installation, at the present time the back pressure has become a major problem. There are presently in use many types of detergents which, when used, form bubbles which remain in the plumbing. When water is forced through the plumbing later on, the detergent bubbles prevent the normal flow of the water through the plumbing and as a result back pressures are created at various points throughout the plumbing system. Such back pressures force the water seals in the traps back up through the inlets into the traps and in certain instances the foamy detergents also are forced out through the inlet. This results not only in undesirable odors within the room in which the plumbing fixture is mounted, but also the overflow of the detergents.

It is therefore the primary object of this invention to provide an improved trap construction which is so constructed that the back pressure which may be exerted thereon in the form of a gas will so act upon the water seal in the trap as to provide equal pressures on opposite sides of the water seal and thus prevent displacement thereof.

Another object of this invention is to provide an improved plumbing fitting in the form of a trap, the plumbing fitting having a bypass pressure equalizing tube which is so constructed that a half of the backflow into the trap is directed to the inlet side of the water seal and thus the pressure on the water seal is equalized and displacement of the water forming the water seal is prevented, thus preventing the breaking of the water seal.

Still another object of this invention is to provide an improved trap construction which is of such a nature that should a vacuum occur on the outlet side of the trap, upon the initial flow of the water forming the water seal of the trap towards the outlet, an inlet end of a bypass tube will be uncovered thus permitting the vacuum to be relieved and the water forming the water seal to return to its initial position in the bowl of the trap and thus preventing the breaking of the water seal.

A still further object of this invention is to provide an improved trap construction which is of such a nature whereby the breaking of the water seal of the trap by a vacuum is eliminated and at the same time the required back pressure on the water seal to cause breaking thereof must be greatly increased.

Figure 2:
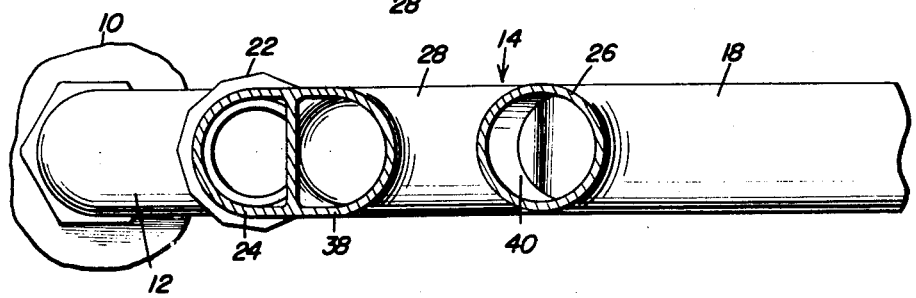

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view taken through the trap which is the subject of this invention and shows the trap connected to a waste fitting of a plumbing fixture; and Figure 2 is a fragmentary horizontal sectional view taken substantially upon the plane indicated by the section line 2—2 of Figure 1 and shows a cross section of the various components of the trap.

Referring now to the drawings in detail, it will be seen that there is illustrated a conventional type of plumbing fitting 10 which has connected to the underside thereof a waste pipe 12. Connected to the waste pipe 12 is the trap which is the subject of this invention, the trap being referred to in general by the reference numeral 14.

The trap 10 includes a vertically disposed inlet 16 and a horizontally disposed outlet 18. The inlet 16 and the outlet 18 are connected together by a U-shaped, intermediate portion 20. The inlet 16 is connected to the waste pipe or waste fitting 12 by means of a coupling 22 which may be of any type. The connection of the outlet 18 to other portions of the plumbing system is not illustrated. However, it is to be understood that it will be a conventional one. At this time it is also pointed out that the configurations of the inlet 16 and the outlet 18 may be varied as is necessary for particular installations.

The U-shaped, intermediate portion 20 includes a first vertical leg 24 and a second vertical leg 26, the vertical legs 24 and 26 being connected together by an upwardly curved bowl 28. The leg 24 is integrally connected to the inlet 16 whereas the leg 26 is integrally connected to the outlet 18. It is to be noted that the outlet 18 includes a very short vertical portion 30 which is connected to the main portion thereof by an intermediate, curved portion 32.

The foregoing components of the trap 14 are normally found in existing traps and a water seal is formed in the bowl 28 between the legs 24 and 26. However, to prevent the breakage of the water seal within the trap 14, there is provided a pressure equalizing bypass tube which is referred to in general by the reference numeral 34. The pressure equalizing bypass tube 34 includes an upwardly bowed curved portion 36 which is connected to the outlet 18 along the curved portion 32 thereof. The tube 34 also includes a vertical leg 38 which is disposed parallel to the inlet 16 and the leg 24 and which opens into the U-shaped intermediate portion 20 into the bowl 28 adjacent the intersection of the leg 24 with the bowl 28.

In order to control flow of back pressure through the trap 14, there is provided a diverter member 40. The diverter member 40 is disposed at the intersection of the pressure bypass tube 34 and the outlet 18 and is so shaped and so positioned that half of the backflow from the outlet 18 is directed through the bypass pressure equalizing tube 34 and half is directed down into the leg 26 of the intermediate portion 20.

In the normal operation of the trap 14, water passing from the fixture 10 passes down into the pipe 12 and then into the inlet 16 of the trap 14. The water from the fixture 10 forces the water which has been forming the seal of the trap 14 up through the leg 26 and out through the outlet 18. At the end of the draining of the fixture 10, water will remain within the intermediate portion 20 to form the seal. The water will be of a sufficient quantity to close the end of the bypass tube 34 at the intersection of its vertical leg 38 with the intermediate portion 20. Thus, the seal within the trap 14 is maintained. Should a vacuum exist within the outlet 18, the effect of the vacuum will be to draw the water forming the water seal out of the intermediate portion 20. However, as the water starts up vertical leg 26 and into the outlet 18, the end of the bypass tube 34 connected to the intermediate portion 20 will be uncovered, and as a result the vacuum will be relieved by the flow of air down through the fixture 10, the pipe 12, the inlet 16 and the leg 24 and through the bypass tube 34. Thus, although the vacuum will be filled, none of the water forming the water seal for the trap 14 will be lost.

In the case of a back pressure on the trap 14 through the outlet 18, the backflowing gases will be divided by the diverter 40 and will pass half into the bypass tube 34 and half into the intermediate portion 20 through the leg 26 thereof. This will result in the pressures on opposite sides of the water forming the water seal to be equalized and thus prevent the backflowing of the water forming the water seal through the waste pipe 12 and the fitting 10, thus eliminating the undesired effects of back pressure which are now found in many plumbing installations.

In a test form of the invention, a trap was constructed in accordance with the invention with the trap having two and three-quarter inches of water standing in the bowl 20 and forming the water seal. Under test conditions, a regular trap requires a negative pressure or a vacuum equal to a column of water having a height of two and three-quarter inches to break the water seal. At the same time, a similar positive pressure would force detergents back through the trap and break the water seal. However, on the trap constructed in accordance with this invention, when the vacuum was sufficient to move the water forming the water seal, the vacuum was immediately relieved upon the uncovering of the bypass tube 34. On the other hand, it was found that six inches of water was the required back pressure to break the water seal. Thus, the present invention, by a test, shows that the effects of a vacuum on a water seal have been alleviated and that the back pressure required to break the water seal has been increased at least one hundred percent.

The present trap has many advantages. It can be used as a protection against vents being blocked by detergents. Also, in the case of long waste arms from vents and in older plumbing systems that are insufficiently vented, the present invention would make stack venting practical. Further, vent size can be reduced, or if the present trap is used, it could be considered as an extra safety feature against sewer gas.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plumbing trap comprising a U-shaped bowl having a pair of vertical inlet and outlet legs communicating with and rising from the opposite ends of a lower portion, a vertical inlet and a horizontal outlet conduit connected to the upper ends of said inlet and outlet legs respectively, said outlet conduit communicating with said outlet leg by a smoothly and continuously curving portion, a pressure equalizing tube having inlet and outlet ends, said outlet end communicating with said continuously curving portion upon the outer wall thereof and at its midportion and curving upwardly therefrom and communicating with said inlet leg at the junction of the latter with said lower portion and at a position which is substantially vertically lower than said outlet end, a diverter carried by the outer wall of said outlet leg and by the outlet end of said equalizer tube at the junction of said outlet leg and said outlet end and presenting inclined diverting surfaces positioned to substantially equally divide a backflow stream of fluid in said outlet conduit between said outlet leg and through said equalizer tube to said inlet leg whereby to subject opposite sides of the trap water to equal pressure, said outlet end having its central axis inclined upwardly from the central axis of said outlet conduit.

2. The combination of claim 1 wherein the cross-sectional area of said outlet leg is substantially greater than that of said inlet end of said equalizer tube whereby creation of a vacuum in said outlet conduit will more rapidly lower the trap water level in said inlet end than the trap water level will rise in said outlet leg to thereby communicate said inlet end with said inlet leg above the water level therein and break the vacuum in said outlet conduit before the trap water from said outlet leg is drawn into said outlet conduit, the inlet end of said equalizer tube having an upper edge communicating with said inlet leg in vertically spaced relation to the communication of its lower edge therewith.

References Cited in the file of this patent
UNITED STATES PATENTS

| | | |
|---|---|---|
| 904,082 | Parker | Nov. 17, 1908 |
| 1,418,941 | Leonard | June 6, 1922 |
| 1,455,279 | Sylvester | May 15, 1923 |